(12) United States Patent
Zheng et al.

(10) Patent No.: US 9,648,334 B2
(45) Date of Patent: May 9, 2017

(54) BI-PREDICTIVE MERGE MODE BASED ON UNI-PREDICTIVE NEIGHBORS IN VIDEO CODING

(75) Inventors: Yunfei Zheng, Cupertino, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 853 days.

(21) Appl. No.: 13/336,799

(22) Filed: Dec. 23, 2011

(65) Prior Publication Data

US 2012/0243609 A1    Sep. 27, 2012

Related U.S. Application Data

(60) Provisional application No. 61/454,862, filed on Mar. 21, 2011, provisional application No. 61/502,703, filed on Jun. 29, 2011.

(51) Int. Cl.
*H04N 19/52* (2014.01)
*H04N 19/196* (2014.01)
(Continued)

(52) U.S. Cl.
CPC ......... *H04N 19/196* (2014.11); *H04N 19/105* (2014.11); *H04N 19/147* (2014.11);
(Continued)

(58) Field of Classification Search
CPC ....... H04N 19/00127; H04N 19/00721; H04N 19/52
(Continued)

(56) References Cited

U.S. PATENT DOCUMENTS

| 5,614,954 A | 3/1997 | Jung |
| 7,099,390 B2 | 8/2006 | Kajita |

(Continued)

FOREIGN PATENT DOCUMENTS

| CN | 101682771 A | 3/2010 |
| RU | 2391794 C2 | 8/2009 |

(Continued)

OTHER PUBLICATIONS

Lim J et al: Extended merging scheme using motion-hypotheses prediction, n.JCTVC-B023,Jul. 23, 2010(Jul. 23, 2010), XP030007603.*

(Continued)

*Primary Examiner* — Tung Vo
*Assistant Examiner* — Rowina Cattungal
(74) *Attorney, Agent, or Firm* — Shumaker & Sieffert, P.A.

(57) ABSTRACT

This disclosure describes a bi-predictive merge mode in which a bi-predictive video block inherits motion information from two different neighboring blocks, wherein the two different neighboring blocks were each encoded in a uni-predictive mode. Bi-predictive coding may improve the ability to achieve compression in video coding. The described bi-predictive merge mode may increase the number of bi-predictive candidates that can be used in the context of merge mode coding by allowing two separate uni-predicted neighbors to be used to define bi-predictive motion information for a video block.

27 Claims, 9 Drawing Sheets

(51) Int. Cl.
*H04N 19/105* (2014.01)
*H04N 19/176* (2014.01)
*H04N 19/147* (2014.01)
*H04N 19/46* (2014.01)
*H04N 19/463* (2014.01)
*H04N 19/577* (2014.01)

(52) U.S. Cl.
CPC ......... *H04N 19/176* (2014.11); *H04N 19/197* (2014.11); *H04N 19/46* (2014.11); *H04N 19/463* (2014.11); *H04N 19/52* (2014.11); *H04N 19/577* (2014.11)

(58) Field of Classification Search
USPC .......................... 375/240.12, 240.16, 240.15
See application file for complete search history.

(56) References Cited

U.S. PATENT DOCUMENTS

| | | |
|---|---|---|
| 7,469,070 B2 | 12/2008 | Winger |
| 8,982,953 B2 | 3/2015 | Sugio et al. |
| 2004/0032907 A1 | 2/2004 | Winger |
| 2004/0086047 A1 | 5/2004 | Kondo et al. |
| 2008/0310745 A1 | 12/2008 | Ye et al. |
| 2009/0116759 A1 | 5/2009 | Suzuki et al. |
| 2010/0202539 A1 | 8/2010 | Kondo et al. |
| 2010/0220784 A1 | 9/2010 | Tanimoto et al. |
| 2011/0038420 A1 | 2/2011 | Lee et al. |
| 2012/0128067 A1* | 5/2012 | Liu ...................... H04N 19/159 375/240.12 |
| 2012/0189062 A1* | 7/2012 | Sugio .................. H04N 19/176 375/240.16 |
| 2012/0224637 A1* | 9/2012 | Sugio et al. ............. 375/240.16 |
| 2012/0300846 A1 | 11/2012 | Sugio et al. |
| 2013/0016785 A1* | 1/2013 | Wang et al. ............. 375/240.16 |
| 2013/0058584 A1 | 3/2013 | Shimizu et al. |
| 2013/0216148 A1 | 8/2013 | Suzuki et al. |
| 2013/0272404 A1* | 10/2013 | Park et al. ............... 375/240.15 |
| 2014/0140408 A1 | 5/2014 | Lee et al. |

FOREIGN PATENT DOCUMENTS

| | | |
|---|---|---|
| RU | 2384971 C1 | 3/2010 |
| RU | 2407220 C2 | 9/2010 |
| WO | 2008157268 | 12/2008 |
| WO | 2012046637 A1 | 4/2012 |
| WO | 2012140821 A1 | 10/2012 |
| WO | 2012160803 A1 | 11/2012 |
| WO | 2012173415 A2 | 12/2012 |
| WO | 2013001803 A1 | 1/2013 |

OTHER PUBLICATIONS

Winken M., et al., "Video coding technology proposal by Fraunhofer HHI", 1. JCT-VC Meeting; Apr. 15, 2010-Apr. 23, 2010; Dresden; (Jointcollaborative Team on Video Coding of ISO/IEC JTC1/SC29/WG11 and ITU-TSG. 16) ; URL: http://WFTP3.ITU.INT/AV-ARCH/JCTVC-SITE/, No. XP030007556, Apr. 24, 2010 (Apr. 24, 2010), XP030007557.
Bross et al., "CE9: Motion Vector Coding Test Report by Fraunhofer HHI," 4th Meeting: Daegu, KR, Jan. 20-28, 2011, JCTVC-D314, 10 pp.
Chen et al., "CE1: Report of DMVD-based Bi—prediction," 5th Meeting: Geneva, CH, Mar. 16-23, 2011, JVCTC-E154 r1, 17 pp.
Sullivan et al., "Meeting report of the second meeting of the Joint Collaborative Team on Video Coding (JCT-VC), Geneva, CH, Jul. 21-28, 2010," JCTVC-B200, 72 pp.
International Search Report and Written Opinion—PCT/US2012/027136, dated Jun. 11, 2012, 12 pp.
Lim et al., "Extended merging scheme using motion-hypothesis inter prediction" 2nd Meeting: Geneva, CH, Jul. 21-28, 2010, JCTVC-B023, 7 pp.

Response to Written Opinion mailed Jun. 11, 2012, from international application No. PCT/US2012/027136, filed Aug. 9, 2012, 20 pp.
Sugio et al., "Parsing Robustness for Merge/AMVP," 6th Meeting: Torino, IT, Jul. 14-22, 2011, JCTVC-F470, 33 pp.
International Preliminary Report on Patentability—PCT/US2012/027136, The International Bureau of WIPO—Geneva, Switzerland, Jul. 3, 2013, 28 pp.
Second Written Opinion of international application No. PCT/US2012/027136, dated Mar. 6, 2013, 5 pp.
Zheng, et al., "Extended Motion Vector Prediction for Bi predictive Mode," JCT-VC Meeting; MPEG Meeting; Mar. 16, 2011-Mar. 23, 2011; Geneva, CH; (Joint Collaborative Team on Video Coding of ITU-T SG.16 WP3 and ISO/IEC JTC1/SC29/WG11) URL: http://wftp3.itu.int/av-arch/jctvc-site/no. jctvc-e343, Mar. 11, 2011, XP030008849, 4 pp.
Zheng, et al., "On Temporal Candidate of Merge and AMVP," Joint Collaborative Team on Video Coding (JCT-VC) of ITU-T SG16 WP3 and ISO/IEC JTC1/SC29/WG11, Geneva, CH; JCTVC-E398, <URL: http://phenix.it-sudparis.eu/jct/doc_end_user/documents/5_Geneva/wg11/JCTVC-E398-v1.zip>, Mar. 19, 2011, 4 pp.
Zheng, et al., "Unified Motion Vector Predictor Selection for Merge and AMVP," MPEG Meeting; Mar. 16, 2011-Mar. 23, 2011; Geneva, CH; (Motion Picture Expert Group or ISO/IEC JTC1/SC29/WG11), No. m19932, Mar. 19, 2011, XP03004849, 5 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Chen et al., "MVP index parsing with fixed number of candidates," Jul. 14-22, 2011, Joint Collaborative Team on Video Coding (JCT-VC) of ITU-T SG16 WP3 and ISO/IEC JTC1/SC29/WG11, 6th Meeting: Torino, IT, Jul. 12, 2011, JCTVC-F402_r1, 17 pp.
Takehara et al., "Bi-derivative merge candidate," Jul. 14-22, 2011, Joint Collaborative Team on Video Coding (JCT-VC) of ITU-T SG16 WP3 and ISO/IEC JTC1/SC29/WG11, 6th Meeting: Torino, IT, Jul. 1, 2011, JCTVC-F372, 5 pp.

(56) References Cited

OTHER PUBLICATIONS

Sugio et al., "Parsing Robustness for MERGE/AMVP," JCT-VC Meeting; Torino, IT, Jul. 14-22, 2011 (Joint Collaborative Team on Video Coding (JCT-VC) of ITU-T SG16 WP3 and ISO/IEC JTC1/SC29/WG11); document No. JCTVC-F470, Jul. 22, 2011, 32 pp.

\* cited by examiner

BI-PREDICTIVE MERGE MODE BASED ON UNI-PREDICTIVE NEIGHBORS IN VIDEO CODING

This application claims the benefit of U.S. Provisional Application No. 61/454,862, filed on Mar. 21, 2011 and U.S. Provisional Application No. 61/502,703, filed on Jun. 29, 2011, the entire content each of which is incorporated herein by reference.

TECHNICAL FIELD

This disclosure relates to video coding techniques used to compress video data and, more particularly; video coding modes used in video compression.

BACKGROUND

Digital video capabilities can be incorporated into a wide range of video devices, including digital televisions, digital direct broadcast systems, wireless communication devices such as wireless telephone handsets, wireless broadcast systems, personal digital assistants (PDAs), laptop or desktop computers, tablet computers, digital cameras, digital recording devices, video gaming devices, video game consoles, personal multimedia players, and the like. Such video devices may implement video compression techniques, such as those described in MPEG-2, MPEG-4, or ITU-T H.264/MPEG-4, Part 10, Advanced Video Coding (AVC), in order compress video data. Video compression techniques perform spatial and/or temporal prediction to reduce or remove redundancy inherent in video sequences. New video standards, such as the High Efficiency Video Coding (HEVC) standard being developed by the "Joint Collaborative Team—Video Coding" (JCTVC), which is a collaboration between MPEG and ITU-T, continue to emerge and evolve. The emerging HEVC standard is sometimes referred to as H.265.

These and other video coding standards and techniques use block-based video coding. Block-based video coding techniques divide the video data of a video frame (or portion thereof) into video blocks and then encode the video blocks using predictive block-based compression techniques. The video blocks may be further divided into video block partitions. The video blocks (or partitions thereof) may be referred to as coding units (CUs) and may be encoded using one or more video-specific encoding techniques as well as general data compression techniques. Different modes may be selected and used to code the video blocks.

With the emerging HEVC standard, largest coding units (LCUs) may be divided into smaller and smaller CUs according to a quadtree partitioning scheme. The CUs may be predicted based on so-called prediction units (PUs), which can have partition sizes corresponding to the size of the CUs or smaller than the size of the CUs, such that multiple PUs can be used to predict a given CU.

Different modes may be used to encode the CUs. For example, different intra coding modes may be used to code the CUs based on predictive data within the same frame or slice so as to exploit spatial redundancy within a video frame. Alternatively, inter coding modes may be used to code CUs based on predictive data from another frame or slice, so as to exploit temporal redundancy across frames of a video sequence. After the predictive coding is performed according to a selected mode, transform coding may then be performed, such as discrete cosine transforms (DCT), integer transforms or the like. With HEVC, the transform coding may occur with respect to transform units (TUs), which can also have varying transform sizes in the HEVC standard. Quantization of the transform coefficients, scanning of the quantized transform coefficients, and entropy coding may also be performed. Syntax information is signaled with encoded video data, e.g., in a video slice header or video block header, in order to inform the decoder how to decode the video data. Among other things, the syntax information may identify the mode that was used in the video coding of different video blocks.

Merge mode is a specific inter coding mode used in video compression. With merge mode, the motion vector of a neighboring video block is inherited for a current video block being coded. In some cases, merge mode causes a current video block to inherit the motion vector of a predefined neighbor, and in other cases, an index value may be used to identify the specific neighbor from which the current video block inherits its motion vector (e.g., top, top right, left, left bottom or co-located from a temporally adjacent frame).

SUMMARY

This disclosure describes a bi-predictive merge mode in which a video block coded in the bi-predictive merge mode inherits its motion information from two different neighboring blocks, wherein the two different neighboring blocks were each encoded in a uni-predictive mode. Bi-predictive coding may improve the ability to achieve compression or improve the video quality at a given level of compression. However, in some cases, there may be no (or few) neighbors that were encoded in a bi-predictive mode, thus rendering bi-prediction unavailable (or limited) with respect to merge mode encoding. The described bi-predictive merge mode may increase the number of bi-predictive candidates that can be used in the context of merge mode coding by allowing two separate uni-predicted neighbors to be used to define bi-predictive motion information for a video block.

In one example, this disclosure describes a method of decoding video data. The method comprises receiving one or more syntax elements for a current video block, wherein the current video block is encoded according to a bi-predictive merge mode, and based on the one or more syntax elements, identifying two different neighboring video blocks coded in uni-predictive modes. The method also comprises using motion information of the two different neighboring video blocks to decode a current video block according to the bi-predictive merge mode.

In another example, this disclosure describes a method of encoding video data. The method comprises selecting a bi-predictive merge mode for encoding a current video block, identifying two different neighboring video blocks coded in uni-predictive modes, using motion information of the two different neighboring video blocks to encode the current video block according to the bi-predictive merge mode, and generating one or more syntax elements to identify the two different neighboring video blocks to a video decoder.

In another example, this disclosure describes a video decoding device that decodes video data. The video decoding device comprises a video decoder configured to receive one or more syntax elements for a current video block, wherein the current video block is encoded according to a bi-predictive merge mode, and based on the one or more syntax elements, identify two different neighboring video blocks coded in uni-predictive modes. The video decoder is configured to use motion information of the two different neighboring video blocks to decode a current video block according to the bi-predictive merge mode.

In another example, this disclosure describes a video encoding device comprising a video encoder configured to select a bi-predictive merge mode for encoding a current video block, identify two different neighboring video blocks coded in uni-predictive modes, use motion information of the two different neighboring video blocks to encode the current video block according to the bi-predictive merge mode, and generate one or more syntax elements to identify the two different neighboring video blocks to a video decoder.

In another example, this disclosure describes a device for decoding video data, the device comprising means for receiving one or more syntax elements for a current video block, wherein the current video block is encoded according to a bi-predictive merge mode, means for identifying two different neighboring video blocks coded in uni-predictive modes based on the one or more syntax elements, and means for using motion information of the two different neighboring video blocks to decode a current video block according to the bi-predictive merge mode.

In another example, this disclosure describes a device for encoding video data, the device comprising means for selecting a bi-predictive merge mode for encoding a current video block, means for identifying two different neighboring video blocks coded in uni-predictive modes, means for using motion information of the two different neighboring video blocks to encode the current video block according to the bi-predictive merge mode, and means for generating one or more syntax elements to identify the two different neighboring video blocks to a video decoder.

The techniques described in this disclosure may be implemented in hardware, software, firmware, or any combination thereof. For example, various techniques may be implemented or executed by one or more processors. As used herein, a processor may refer to a microprocessor, an application specific integrated circuit (ASIC), a field programmable gate array (FPGA), a digital signal processor (DSP), or other equivalent integrated or discrete logic circuitry. Software may be executed by one or more processors. Software comprising instructions to execute the techniques may be initially stored in a computer-readable medium and loaded and executed by a processor.

Accordingly, this disclosure also contemplates computer-readable storage media comprising instructions to cause a processor to perform any the techniques described in this disclosure. In some cases, the computer-readable storage medium may form part of a computer program storage product, which may be sold to manufacturers and/or used in a device. The computer program product may include the computer-readable medium, and in some cases, may also include packaging materials.

In particular, this disclosure also describes a computer-readable medium comprising instructions that upon execution cause a processor to decode video data, wherein the instructions cause the processor to upon receiving one or more syntax elements for a current video block, wherein the current video block is encoded according to a bi-predictive merge mode, identify two different neighboring video blocks coded in uni-predictive modes based on the one or more syntax elements, use motion information of the two different neighboring video blocks to decode a current video block according to the bi-predictive merge mode.

In yet another example, this disclosure describes a computer-readable medium comprising instructions that upon execution cause a processor to encode video data, wherein the instructions cause the processor to select a bi-predictive merge mode for encoding a current video block, identify two different neighboring video blocks coded in uni-predictive modes, use motion information of the two different neighboring video blocks to encode the current video block according to the bi-predictive merge mode, and generate one or more syntax elements to identify the two different neighboring video blocks to a video decoder.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
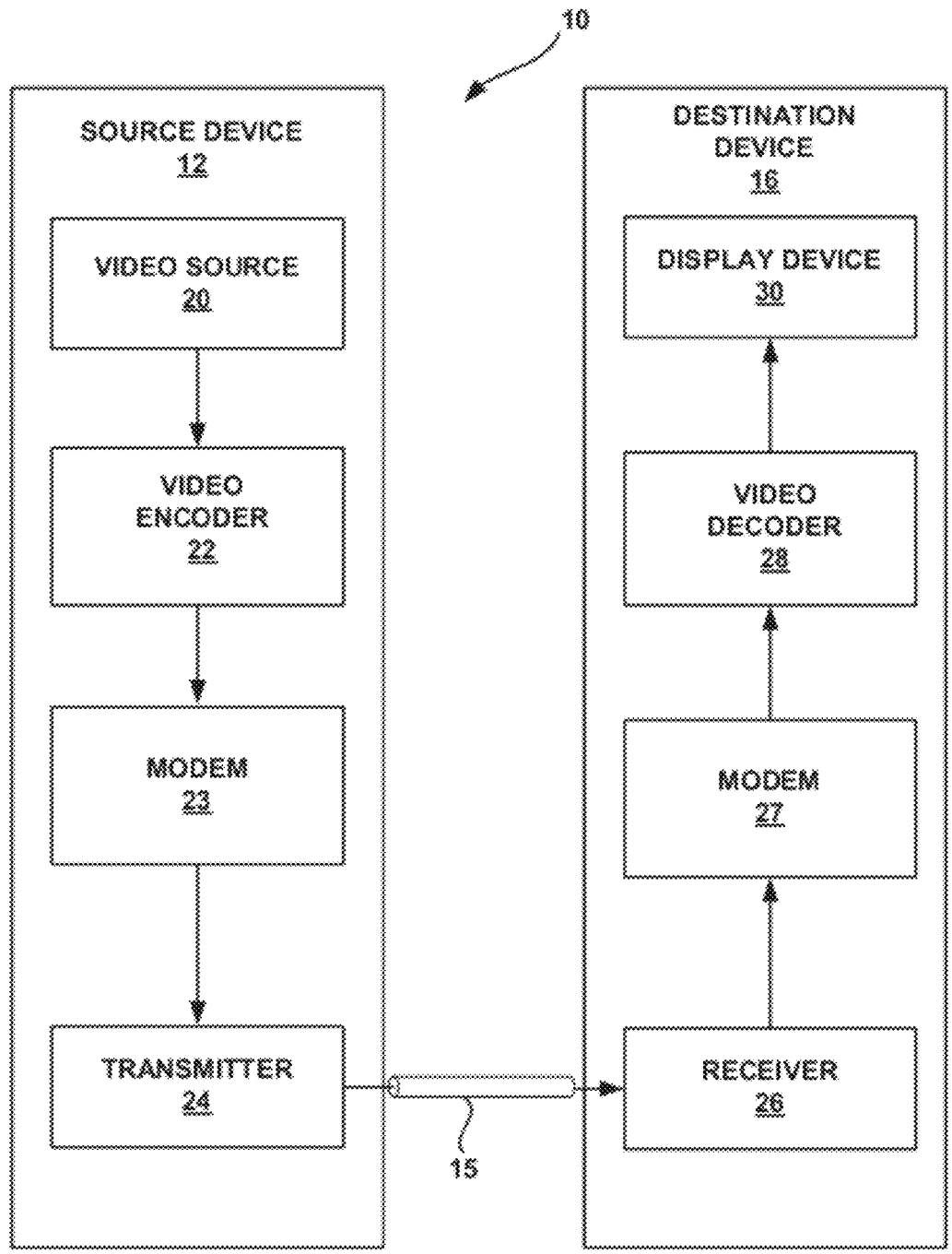
FIG. 1 is a block diagram illustrating one exemplary video encoding and decoding system that may implement one or more of the techniques of this disclosure.

In most video coding systems, motion estimation and motion compensation are used to reduce the temporal redundancy in a video sequence, in order to achieve data compression. In this case, a motion vector can be generated so as to identify a predictive block of video data, e.g., from another video frame or slice, which can be used to predict the values of the current video block being coded. The values of the predictive video block are subtracted from the values of the current video block to produce a block of residual data. The motion vector is communicated from the encoder to the decoder, along with the residual data. The decoder can locate the same predictive block (based on the motion vector) and reconstruct the encoded video block by combining the residual data with the data of the predictive block. Many other compression techniques can also be used, such as transforms and entropy coding, to further improve the video compression.

The motion estimation process is usually done at the encoder. Motion information (such as motion vectors, motion vector indexes, prediction directions, or other information) can be encoded and transmitted from the encoder to the decoder so that the decoder can identify the same predictive block that was used to encode a given video block. Many different encoding modes can be used to allow for different types of temporal prediction between two different frames or different types of spatial prediction within a given frame.

With so-called merge mode, the motion information of a neighboring video block is inherited for a current video block being coded. In this case, the motion vector itself is not transmitted for a video block coded in merge mode. Rather, an index value may be used to identify the neighbor from which the current video block inherits its motion vector (and possibly other motion information). For example, motion information may be inherited from a top neighbor, a top right neighbor, a left neighbor, a left bottom neighbor or a co-located temporal neighbor from a temporally adjacent frame.

With most merge modes, if the neighbor is encoded in a uni-predictive mode, then the current video block inherits one motion vector. If the neighbor is encoded in a bi-predictive mode, then the current video block inherits two motion vectors. In such examples, a block being coded in merge mode is limited by the motion information of its neighbors. Uni-prediction and bi-prediction are sometimes referred to as uni-directional (P) prediction and bi-directional (B) prediction, but the term "directional" is generally misplaced because with modern video coding standards, bi-prediction is simply based on two different lists of predictive data and direction is not mandated. In other words, the data in the two different lists for bi-prediction may come from previous or subsequent frames, and does not need to be bi-directional from both previous and subsequent frames respectively. For this reason, this disclosure uses the terms uni-prediction and bi-prediction rather than the terms uni-directional prediction and bi-directional prediction.

Bi-predictive coding may improve the ability to achieve compression or improve the video quality at a given level of compression. However, in some cases, there may be no (or few) neighbors that were encoded in a bi-predictive mode, thus rendering bi-prediction unavailable (or limited) in merge mode encoding. For example, with conventional merge mode, if there is no bi-predictive mode in any of the neighboring blocks, the current block may lose the opportunity to exploit the benefits that may arise from bi-prediction.

This disclosure describes a bi-predictive merge mode as an extension or addition to merge mode techniques. More specifically, this disclosure describes a bi-predictive merge mode that inherits motion information from two different neighboring blocks, wherein the two different neighboring blocks were each encoded in a uni-predictive mode. The described bi-predictive merge mode may increase the number of bi-predictive candidates that can be used in the context of merge mode coding.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply generally to the encoding and decoding of video blocks in bi-predictive merge mode may be applied to non-wireless devices including video encoding and/or decoding capabilities. Source device 12 and destination device 16 are merely examples of coding devices that can support the techniques described herein.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode one or more video blocks according to a bi-predictive merge mode. With bi-predictive merge mode, a video block inherits its motion information from two different neighboring blocks, wherein the two different neighboring blocks were each encoded in a uni-predictive mode. Syntax elements may be generated at video encoder 22 in order to identify the two different neighboring video blocks coded in uni-predictive modes. In this way, a video decoder can reconstruct a bi-predictive video block based on motion information of the two different neighboring video blocks identified by the syntax elements.

More specifically, video encoder 22 may select a bi-predictive merge mode for encoding a current video block, and identify two different neighboring video blocks coded in uni-predictive modes. Video encoder 22 may use motion information of the two different neighboring video block's to encode the current video block according to the bi-predictive merge mode, and generate one or more syntax elements to identify the two different neighboring video blocks to a video decoder.

Video source 20 may comprise a video capture device, such as a video camera, a video archive containing previously captured video, a video feed from a video content provider or another source of video. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA), orthogonal frequency division multiplexing (OFDM) or any other communication standard or technique. The encoded and modulated data can then be transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas. Receiver 26 of destination device 16 receives information over channel 15, and modem 27 demodulates the information.

The video decoding process performed by video decoder 28 may include reciprocal techniques to the encoding techniques performed by video encoder 22. In particular, video decoder 28 may receive one or more syntax elements for a current video block, wherein the current video block is encoded according to a bi-predictive merge mode, and based on the one or more syntax elements, identify two different neighboring video blocks coded in uni-predictive modes. Video decoder may use motion information of the two different neighboring video blocks to decode a current video block according to the bi-predictive merge mode.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Again, FIG. 1 is merely exemplary and the techniques of this disclosure may apply to video coding settings (e.g., video encoding or video decoding) that do not necessarily include any data communication between the encoding and decoding devices. In other examples, data could be retrieved from a local memory, streamed over a network, or the like.

In some cases, video encoder 22 and video decoder 28 may operate substantially according to a video compression standard such as the emerging HEVC standard. However, the techniques of this disclosure may also be applied in the context of a variety of other video coding standards, including some old standards, or new or emerging standards. Although not shown in FIG. 1, in some cases, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In this disclosure, the term coder refers to an encoder, a decoder, or CODEC, and the terms coder, encoder, decoder and CODEC all refer to specific machines designed for the coding (encoding and/or decoding) of video data consistent with this disclosure.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or operations. In general, video encoder 22 operates on blocks of video data consistent with the HEVC standard. Consistent with HEVC, the video blocks are referred to as coding units (CUs) and many CUs exist within individual video frames (or other independently defined units of video, such as slices). Frames, slices, portions of frames, groups of pictures, or other data structures may be defined as units of video information that include a plurality of CUs. The CUs may have varying sizes consistent with the HEVC standard, and the bitstream may define largest coding units (LCUs) as the largest size of CU. The bi-predictive merge mode may be used to encode LCUs, CUs, or possibly other types of video blocks. With the HEVC standard, LCUs may be divided into smaller and smaller CUs according to a quadtree partitioning scheme, and the different CUs that are defined in the scheme may be further partitioned into so-called prediction units (PUs). The LCUs, CUs, and PUs are all video blocks within the meaning of this disclosure.

Video encoder 22 may perform predictive coding in which a video block being coded (e.g., a PU of a CU within an LCU) is compared to one or more predictive candidates in order to identify a predictive block. This process of predictive coding may be intra (in which case the predictive data is generated based on neighboring intra data within the same video frame or slice) or inter (in which case the predictive data is generated based on video data in previous or subsequent frames or slices). Many different coding modes may be supported, and video encoder 22 may select a desirable video coding mode. According to this disclosure, at least some video blocks may be coded using the bi-predictive merge mode described herein.

After generating the predictive block, the differences between the current video block being coded and the predictive block are coded as a residual block, and prediction syntax (such as a motion vector in the case of inter coding, or a predictive mode in the case of intra coding) is used to identify the predictive block. Moreover, with the bi-predictive merge mode described herein, the prediction syntax (e.g., syntax elements) may identify two different neighboring video blocks to a video decoder. Accordingly, the decoder can identify two different neighboring video blocks coded in uni-predictive modes, based on the syntax elements, and use motion information of the two different neighboring video blocks to decode a current video block according to the bi-predictive merge mode.

The residual block may be transformed and quantized. Transform techniques may comprise a DCT process or conceptually similar process, integer transforms, wavelet transforms, or other types of transforms. In a DCT process, as an example, the transform process converts a set of pixel values (e.g., residual pixel values) into transform coefficients, which may represent the energy of the pixel values in the frequency domain. The HEVC standard allows for transformations according to transformation units (TUs), which may be different for different CUs. The TUs are typically sized based on the size of PUs within a given CU defined for a partitioned LCU, although this may not always be the case. The TUs are typically the same size or smaller than the PUs.

Quantization may be applied to the transform coefficients, and generally involves a process that limits the number of bits associated with any given transform coefficient. More specifically, quantization may be applied according to a quantization parameter (QP) defined at the LCU level. Accordingly, the same level of quantization may be applied to all transform coefficients in the TUs associated with different PUs of CUs within an LCU. However, rather than signal the QP itself, a change (i.e., a delta) in the QP may be signaled with the LCU to indicate the change in QP relative to that of a previous LCU.

Following transform and quantization, entropy coding may be performed on the quantized and transformed residual video blocks. Syntax elements may also be included in the entropy coded bitstream. In general, entropy coding comprises one or more processes that collectively compress a sequence of quantized transform coefficients and/or other syntax information. Scanning techniques may be performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data that is used for subsequent prediction-based coding of subsequent video blocks. This is often referred to as a decoding loop of the encoding process, and generally mimics the decoding that is performed by a decoder device. In the decoding loop of an encoder or a decoder, filtering techniques may be used to improve video quality, and e.g., smooth pixel boundaries and possibly remove artifacts from decoded video. This filtering may be in-loop or post-loop. With in-loop filtering, the filtering of reconstructed video data occurs in the coding loop, which means that the filtered data is stored by an encoder or a decoder for subsequent use in the prediction of subsequent image data. In contrast, with post-loop filtering the filtering of reconstructed video data occurs out of the coding loop, which means that unfiltered versions of the data are stored by an encoder or a decoder for subsequent use in the prediction of subsequent image data. The loop filtering often follows a separate deblock filtering process, which typically applies filtering to pixels that are on or near boundaries of adjacent video blocks in order to remove blockiness artifacts that manifest at video block boundaries.

Relative to previous coding standards, the emerging HEVC standard introduces new terms and block sizes for video blocks. In particular, HEVC refers to coding units (CUs), which can be partitioned according to a quadtree partitioning scheme. An "LCU" refers to the largest sized coding unit (e.g., the "largest coding unit") supported in a given situation. The LCU size may itself be signaled as part of the bitstream, e.g., as sequence level syntax. The LCU can be partitioned into smaller CUs. The CUs may be partitioned into prediction units (PUs) for purposes of prediction. The PUs may have square or rectangular shapes. Transforms are not fixed in the emerging HEVC standard, but are defined according to transform unit (TU) sizes, which may be the same size as a given CU, or possibly smaller. The residual data for a given CU may be communicated in the TUs. Syntax elements may be defined at the LCU level, the CU level, the PU level and the TU level.

Figure 2:
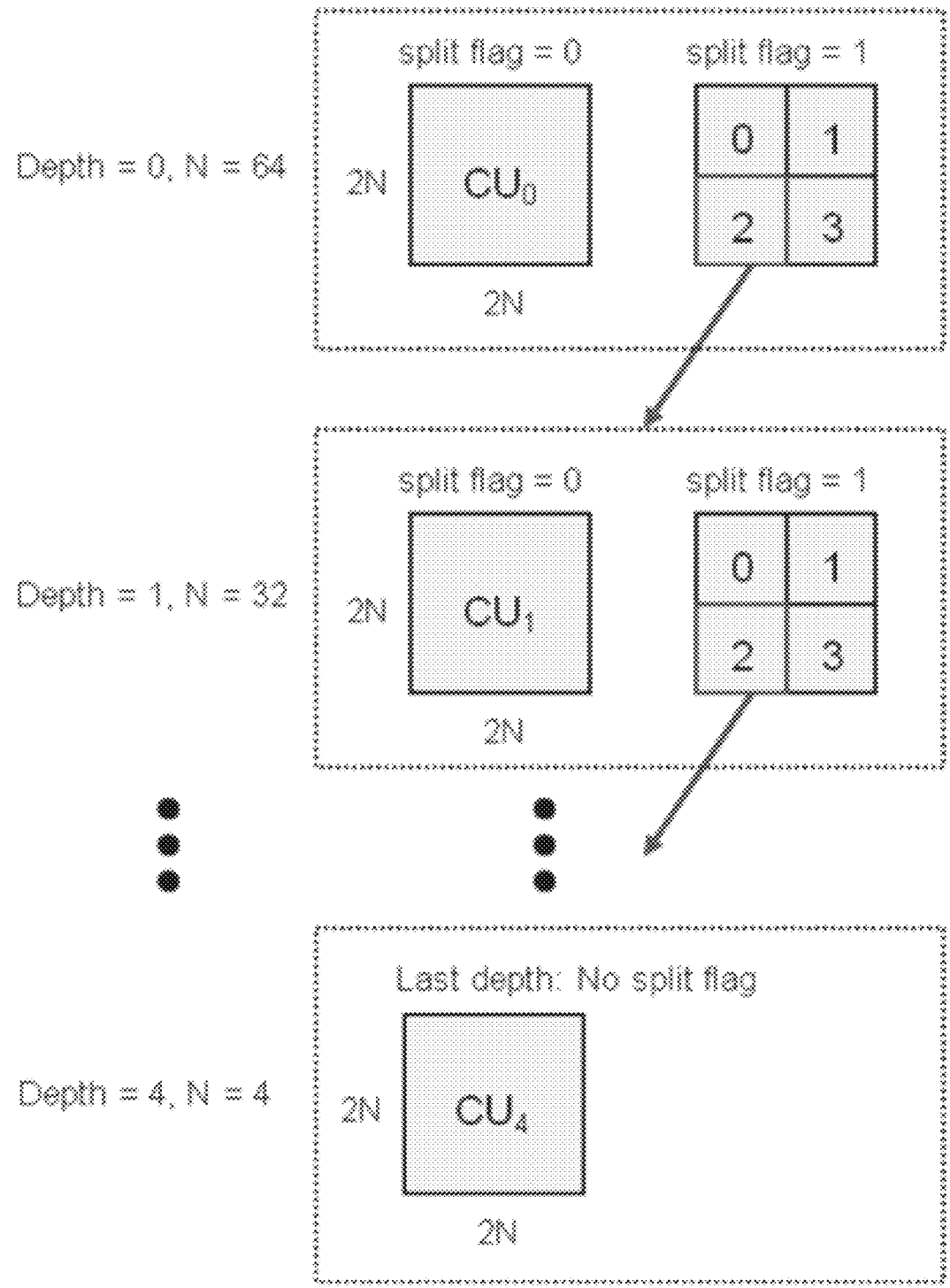
FIG. 2 is a conceptual diagram illustrating quadtree partitioning of coding units (CUs) consistent with the techniques of this disclosure.

To illustrate video blocks according to the HEVC standard, FIG. 2 conceptually shows an LCU of depth 64 by 64, which is then partitioned into smaller CUs according to a quadtree partitioning scheme. Elements called "split flags" may be included as CU-level syntax to indicate whether any given CU is itself sub-divided into four more CUs. In FIG. 2, $CU_0$ may comprise the LCU, $CU_1$ through $CU_4$ may comprise sub-CUs of the LCU. The bi-predictive merge mode syntax elements, as described in this disclosure, may be defined at the CU level (or possibly the LCU level if the LCU is not split into smaller CUs). Bi-predictive merge mode might also be supported for PUs of CUs, in some examples.

Figure 3:
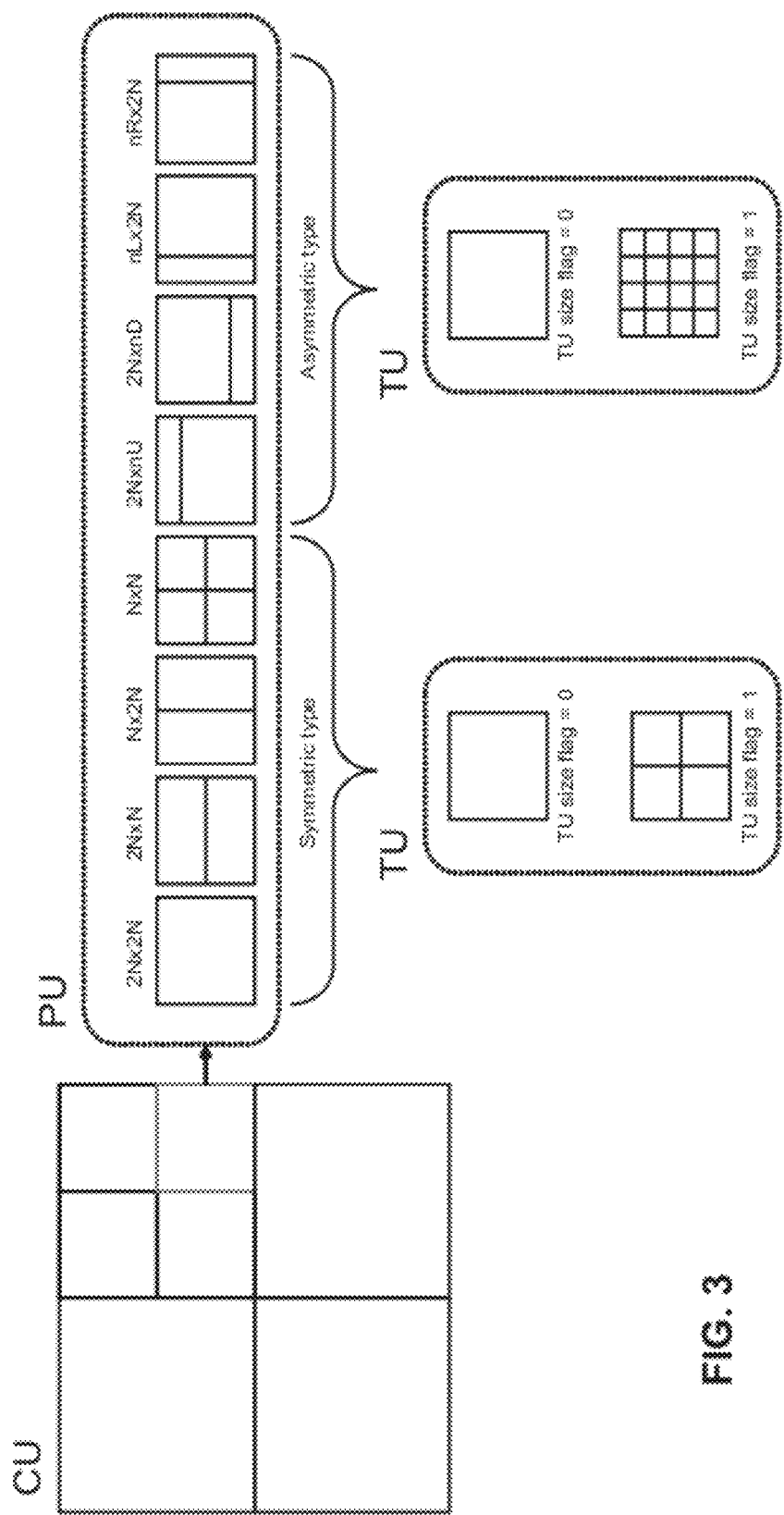
FIG. 3 is a conceptual diagram illustrating some possible relationships between CUs, prediction units (PUs) and transform units (TUs) consistent with the techniques of this disclosure.

FIG. 3 further illustrates one possible relationship between CUs, PUs and TUs, which may be consistent with the emerging HEVC standard or other standards. However, other relationships are also possible, and FIG. 3 is merely shown as one possible example. In this case, any given CU of an LCU may itself be partitioned into PUs, such as those illustrated in FIG. 3. The PU type for a given CU may be signaled as CU-level syntax. As shown in FIG. 3, symmetric type PUs and asymmetric type PUs can be defined for a given CU. Moreover, two different TU structures may be defined for each of the four symmetric type PUs and asymmetric type PUs. Thus, a one-bit syntax element (TU size flag) may be used to signal the TU size, which may also be dependent on the PU type (symmetric or asymmetric). Coded block patterns (CBPs) may be defined for an LCU in order to indicate whether any given CU includes non-zero transform coefficients (e.g., whether any TUs are present).

In other examples, TUs may be defined differently than shown in FIG. 3. For example, residual samples corresponding to a CU may be subdivided into smaller units using a quadtree structure known as "residual quad tree" (RQT). The leaf nodes of the RQT may be referred as transform units (TUs). In some cases, TU's may be defined for a CU according to a quadtree structure, but the TU's may not necessarily depend on the PU's defined for any given CU. The PU's used for prediction may be defined separately from TU's of any CU. A number of different types of partitioning schemes for CU's, TU's, and PU's are possible.

Figure 4:
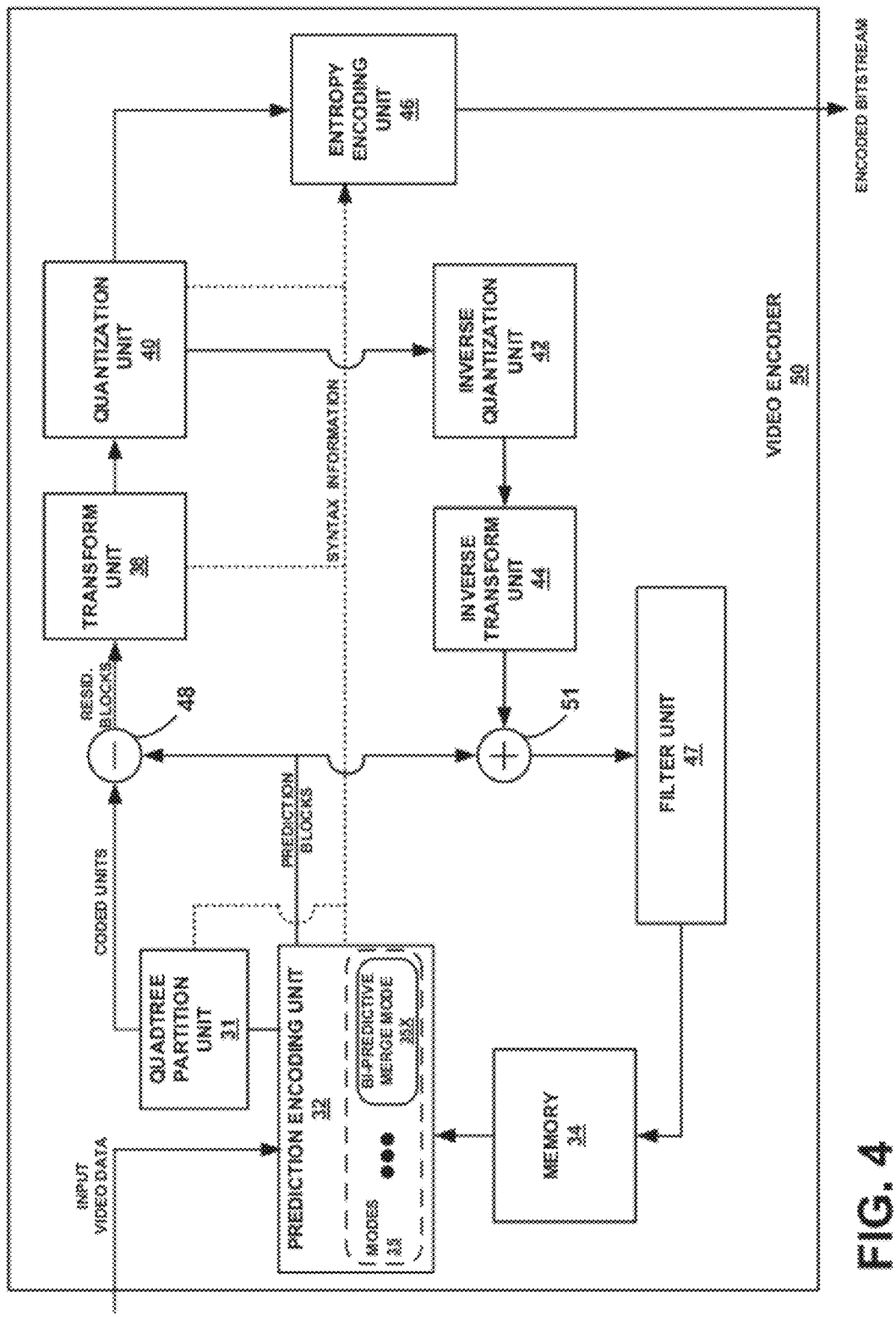
FIG. 4 is block diagram illustrating a video encoder that may implement techniques of this disclosure.

FIG. 4 is a block diagram illustrating a video encoder 50 consistent with this disclosure. Video encoder 50 may correspond to video encoder 22 of device 20, or a video encoder of a different device. As shown in FIG. 4, video encoder 50 includes a prediction encoding unit 32 quadtree partition unit 31, adders 48 and 51, and a memory 34. Video encoder 50 also includes a transform unit 38 and a quantization unit 40, as well as an inverse quantization unit 42 and an inverse transform unit 44. Video encoder 50 also includes an entropy coding unit 46, and a filter unit 47, which may include deblock filters and post loop and/or in loop filters. The encoded video data and syntax information that defines the manner of the encoding may be communicated to entropy encoding unit 46, which performs entropy encoding on the bitstream.

As shown in FIG. 4, prediction encoding unit 32 may support a plurality of different coding modes 35 in the encoding of video blocks. Modes 35 may include inter coding modes that define predictive data from different video frames (or slices). The inter coding modes may be bi-predictive, meaning that two different lists (e.g., List 0 and List 1) of predictive data (and typically two different motion vectors) are used to identify the predictive data. The inter coding modes may alternatively be uni-predictive, meaning that one list (e.g., List 0) of predictive data (and typically one motion vector) is used to identify the predictive data. Interpolations, offsets or other techniques may be performed in conjunction with the generation of predictive data. So-called SKIP modes and DIRECT modes may also be supported, which inherit motion information associated with a co-located block of another frame (or slice). SKIP mode blocks do not include any residual information, while DIRECT mode blocks include residual information.

In addition, modes 35 may include inter coding modes, which define predictive data based on data within the same video frame (or slice) as that being coded. Intra coding modes may include directional modes that define predictive data based on data in a particular direction within the same frame, as well as DC and/or planar modes that define predictive data based on the average or weighted average of neighboring data. Prediction encoding unit 32 may select the mode for a given block based on some criteria, such as based on an rate-distortion analysis or some characteristics of the block, such as the block size, texture or other characteristics.

In accordance with this disclosure, prediction encoding unit 32 supports a bi-predictive merge mode 35X. With bi-predictive merge mode 35X, a video block being coded inherits motion information from two different neighboring blocks, wherein the two different neighboring blocks were each encoded in a uni-predictive mode. Thus, the video block is coded with two different motion vectors that come from two different neighboring video blocks. In this case, prediction encoding unit 32 outputs an indication that the bi-predictive merge mode was used for a given block, and outputs syntax elements that identify the two different uni-predictive neighbors that collectively define the motion information for the current bi-predictive block. Predictive blocks associated with the bi-predictive merge mode may be combined into one bi-predictive block (possibly using weighting factors), and the bi-predictive block may be subtracted from the block being coded (via summer 48) to define residual data associated with the block coded in the bi-predictive merge mode.

The motion information may comprise two different uni-predictive motion vectors associated with the two different neighboring video blocks. These two different uni-predictive motion vectors can be used as the two bi-predictive motion vectors of the current video block. The motion information may further comprise two reference index values associated with the two different uni-predictive motion vectors, wherein the reference index values identify one or more lists of predictive data associated with the two different uni-predictive motion vectors. Again, residual data may be generated as the difference between the block being coded and the predictive data defined by the two different uni-predictive motion vectors that collectively define the bi-predictive merge block used in the prediction.

In the case of HEVC, the current video block being coded may comprise a so-called CU defined relative to an LCU according to a quadtree partitioning scheme. In this case, quadtree partition unit 31 may generate LCU syntax data that defines the quadtree partitioning scheme, and prediction encoding unit 32 may generate mode information for the CU that defines the bi-predictive merge mode, wherein the one or more syntax elements (which identify the two uni-predictive neighbors) are included in the mode information for the CU.

The described bi-predictive merge mode may increase the number of bi-predictive candidates that can be used in the context of merge mode coding. For example, if none of the neighbors are coded in bi-predictive mode, the described bi-predictive merge mode may allow bi-prediction to be exploited by combining the motion information of two neighbors in predicting the current video block. Also, even if one or more neighbors are coded in bi-predictive mode, combining two uni-directional neighbors according to the described bi-predictive merge mode may still provide coding gains in some situations.

Generally, during the encoding process, video encoder 50 receives input video data. Prediction encoding unit 32 performs predictive coding techniques on video blocks (e.g. CUs and PUs) Quadtree partition unit 31 may break an LCU into smaller CU's and PU's according to HEVC partitioning explained above with reference to FIGS. 2 and 3. For inter coding, prediction encoding unit 32 compares CUs or PUs to various predictive candidates in one or more video reference frames or slices (e.g., one or more "list" of reference data) in order to define a predictive block. For intra coding, prediction encoding unit 32 generates a predictive block based on neighboring data within the same video frame or slice. Prediction encoding unit 32 outputs the prediction block and adder 48 subtracts the prediction block from the CU or PU being coded in order to generate a residual block. Again, at least some video blocks may be coded using the bi-predictive merge mode described herein.

Figure 5:
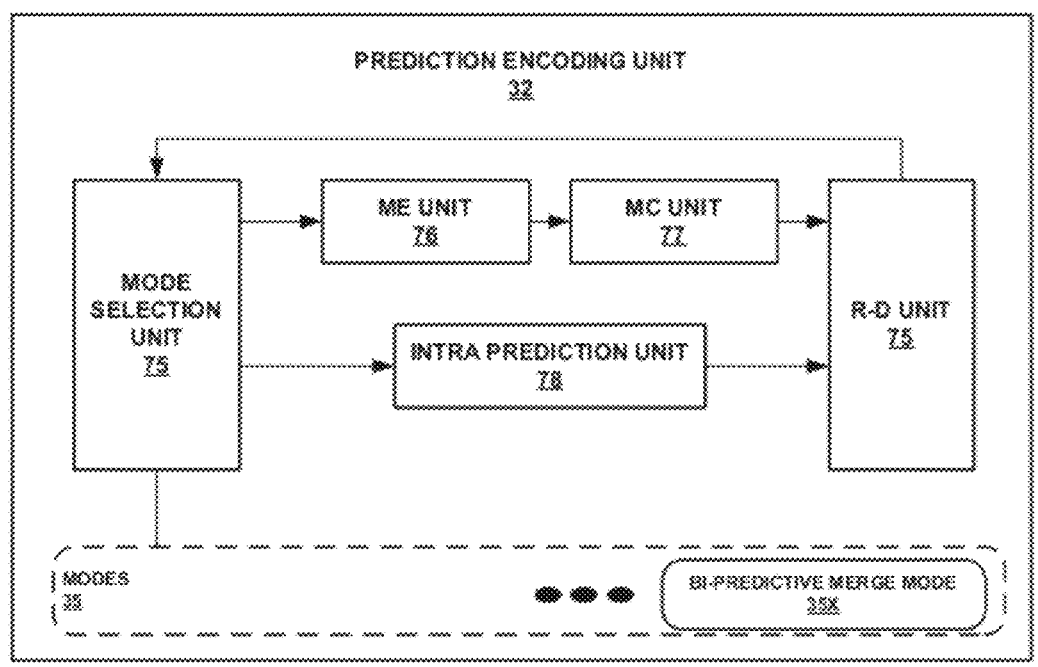
FIG. 5 is a block diagram illustrating an exemplary prediction unit of an encoder, consistent with one or more examples of this disclosure

FIG. 5 illustrates one example of prediction encoding unit 32 of video encoder 50 in greater detail. Prediction encoding unit 32 may include a mode selection unit 75 that selects the desired mode from modes 35, which include bi-predictive merge mode 35X as a possibility. For inter coding, prediction encoding unit 32 may comprise motion estimation (ME) unit 76 and motion compensation (MC) unit 77 that identify one or more motion vectors that points to predictive data, and generates the prediction block based on the motion vector. Typically, motion estimation is considered the process of generating the one or more motion vectors, which estimate motion. For example, the motion vector may indicate the displacement of a predictive block within a predictive frame relative to the current block being coded within the current frame. In the case bi-predictive merge mode 35X, two uni-directional motion vectors of two neighbors are combined to create a bi-directional prediction.

Motion compensation is typically considered the process of fetching or generating the predictive block (or blocks) based on the motion vector determined by motion estimation. In some cases, motion compensation for inter-coding may include interpolations to sub-pixel resolution, which permits the motion estimation process to estimate motion of video blocks to such sub-pixel resolution. Weighted combinations of two blocks (in the case of bi-prediction) may also be used.

For intra coding, prediction encoding unit 32 may comprise intra prediction unit 78. In this case, predictive data may be generated based on data within the current video block (e.g., adjacent to the video block being coded). Again, intra coding modes may include directional modes that define predictive data based on data in a particular direction within the same frame, as well as DC and/or planar modes that define predictive data based on the average or weighted average of neighboring data.

Rate-distortion (R-D) unit 79 may compare coding results of video blocks (e.g., CUs or PUs) in different modes. In addition R-D unit 79 may allow for other types of parameter adjustments, such as adjustments to interpolations, offsets, quantization parameters, or other factors that can affect the coding rate. Mode selection unit 75 can analyze the coding results in terms of coding rate (i.e., coding bits required for the block) and distortion (e.g., representing the video quality of the coded block relative to the original block) in order to make mode selections for video blocks. In this way, R-D unit 79 provides analysis of the results of different modes to allow mode selection unit 75 to select the desired mode for different video blocks. Consistent with this disclosure, the bi-predictive merge mode 35X may be selected when R-D unit 79 identifies it as the desired mode for a given video block, e.g., due to coding gains or coding efficiency.

Referring again to FIG. 4, after prediction encoding unit 32 outputs the prediction block, and after adder 48 subtracts the prediction block from the video block being coded in order to generate a residual block of residual pixel values, transform unit 38 applies a transform to the residual block. The transform may comprise a discrete cosine transform (DCT) or a conceptually similar transform such as that defined by the ITU H.264 standard or the HEVC standard. So-called "butterfly" structures may be defined to perform the transforms, or matrix-based multiplication could also be used. In some examples, consistent with the HEVC standard, the size of the transform may vary for different CUs, e.g., depending on the level of partitioning that occurs with respect to a given LCU. Transform units (TUs) may be defined in order to set the transform size applied by transform unit 38. Wavelet transforms, integer transforms, sub-band transforms or other types of transforms could also be used. In any case, transform unit applies the transform to the residual block, producing a block of residual transform coefficients. The transform, in general, may convert the residual information from a pixel domain to a frequency domain.

Quantization unit 40 then quantizes the residual transform coefficients to further reduce bit rate. Quantization unit 40, for example, may limit the number of bits used to code each of the coefficients. In particular, quantization unit 40 may apply the delta QP defined for the LCU so as to define the level of quantization to apply (such as by combining the delta QP with the QP of the previous LCU or some other known QP). After quantization is performed on residual samples, entropy coding unit 46 may scan and entropy encode the data.

CAVLC is one type of entropy coding technique supported by the ITU H.264 standard and the emerging HEVC standard, which may be applied on a vectorized basis by entropy coding unit 46. CAVLC uses variable length coding (VLC) tables in a manner that effectively compresses serialized "runs" of coefficients and/or syntax elements. CABAC is another type of entropy coding technique supported by the ITU H.264 standard or the HEVC standard, which may be applied on a vectorized basis by entropy coding unit 46. CABAC may involve several stages, including binarization, context model selection, and binary arithmetic coding. In this case, entropy coding unit 46 codes coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. The encoded video may comprise the entropy coded vectors and various syntax information (including the syntax information that defines two neighbors in the case of bi-predictive merge mode). Such information can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction encoding unit 32 to produce a reconstructed video block for storage in memory 34. Prior to such storage, however, filter unit 47 may apply filtering to the video block to improve video quality. The filtering applied by filter unit 47 may reduce artifacts and smooth pixel boundaries. Moreover, filtering may improve compression by generating predictive video blocks that comprise close matches to video blocks being coded.

According to this disclosure, bi-predictive merge mode 35X that inherits motion information from two different neighboring blocks is supported, wherein the two different neighboring blocks were each encoded in a uni-predictive mode. The described bi-predictive merge mode 35X may increase the number of bi-predictive candidates that can be used in the context of merge mode coding. Accordingly, R-D unit 79 (FIG. 5) may identify bi-predictive merge mode 35X as the most desirable coding mode due to coding gains achieved by this mode relative to other modes. In such cases, mode selection unit 75 may select bi-predictive merge mode 35X for coding one video blocks.

Figure 6:
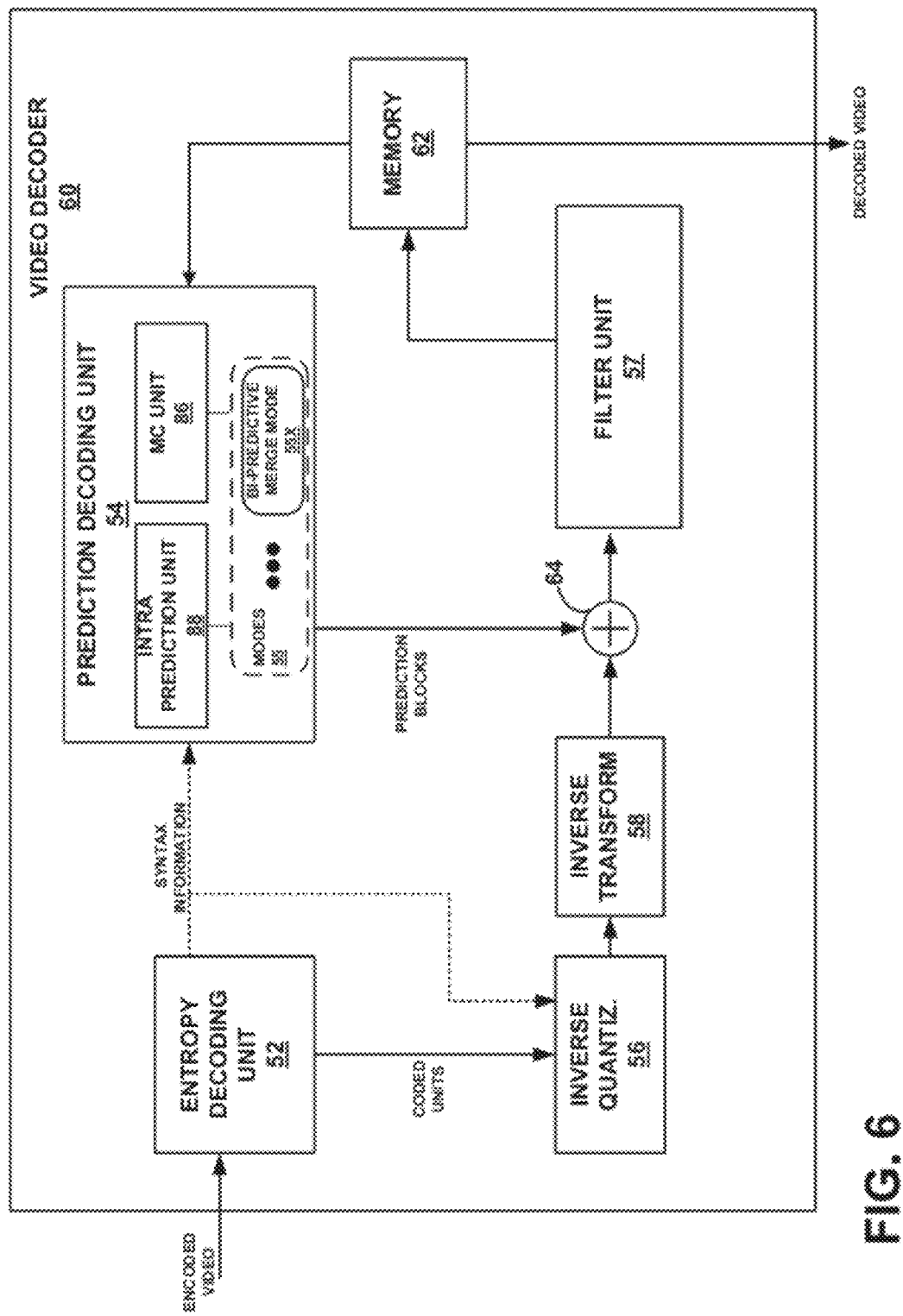
FIG. 6 is a block diagram illustrating a video decoder that may implement techniques of this disclosure.

FIG. 6 is a block diagram illustrating an example of a video decoder 60, which decodes a video sequence that is encoded in the manner described herein. The techniques of this disclosure may be performed by video decoder 60 in some examples. In particular, video decoder 60 receives one or more syntax elements for a current video block, wherein the current video block is encoded according to a bi-predictive merge mode, and based on the one or more syntax elements, identifies two different neighboring video blocks coded in uni-predictive modes. Video decoder 60 then uses motion information of the two different neighboring video blocks to decode a current video block according to the bi-predictive merge mode.

A video sequence received at video decoder 60 may comprise an encoded set of image frames, a set of frame slices, a commonly coded group of pictures (GOPs), or a wide variety of units of video information that include encoded LCUs (or other video blocks) and syntax information to define how to decode such LCUs. The process of decoding the LCUs may include decoding an indication of the coding mode, which may be the bi-predictive merge mode described herein.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Video decoder 60 also includes a prediction decoding unit 54, an inverse quantization unit 56, an inverse transform unit 58, a memory 62, and a summer 64. In particular, like video encoder 50, video decoder 60 includes a prediction decoding unit 54 and a filter unit 57. Prediction decoding unit 54 of video decoder 60 may include motion compensation unit 86, which decodes inter coded blocks and possibly includes one or more interpolation filters for sub-pixel interpolation in the motion compensation process. Prediction decoding unit 54 may also include an intra prediction unit for decoding intra modes. Prediction decoding unit 54 may support a plurality of modes 35 including bi-predictive merge mode 55X. Filter unit 57 may filter the output of summer 64, and may receive entropy decoded filter information so as to define the filter coefficients applied in the loop filtering.

Upon receiving encoded video data, entropy decoding unit 52 performs reciprocal decoding to the encoding performed by entropy encoding unit 46 (of encoder 50 in FIG. 4). At the decoder, entropy decoding unit 52 parses the bitstream to determine LCU's and the corresponding partitioning associated with the LCU's. In some examples, an LCU or the CUs of the LCU may define coding modes that were used, and these coding modes may include the bi-predictive merge mode. Accordingly, entropy decoding unit 52 may forward the syntax information to prediction unit that identifies the bi-predictive merge mode. In this case, the syntax information may include one or more syntax elements that identify two different neighboring video blocks coded in uni-predictive modes. In this case, MC unit 86 of prediction decoding unit 54 may use motion information of the two different neighboring video blocks to decode a current video block according to the bi-predictive merge mode. That is, MC unit 86 may fetch predictive data identified by the motion information of the two different neighboring video blocks, and use some combination of this predictive data in decoding the current video block in bi-predictive merge mode.

Figure 7:
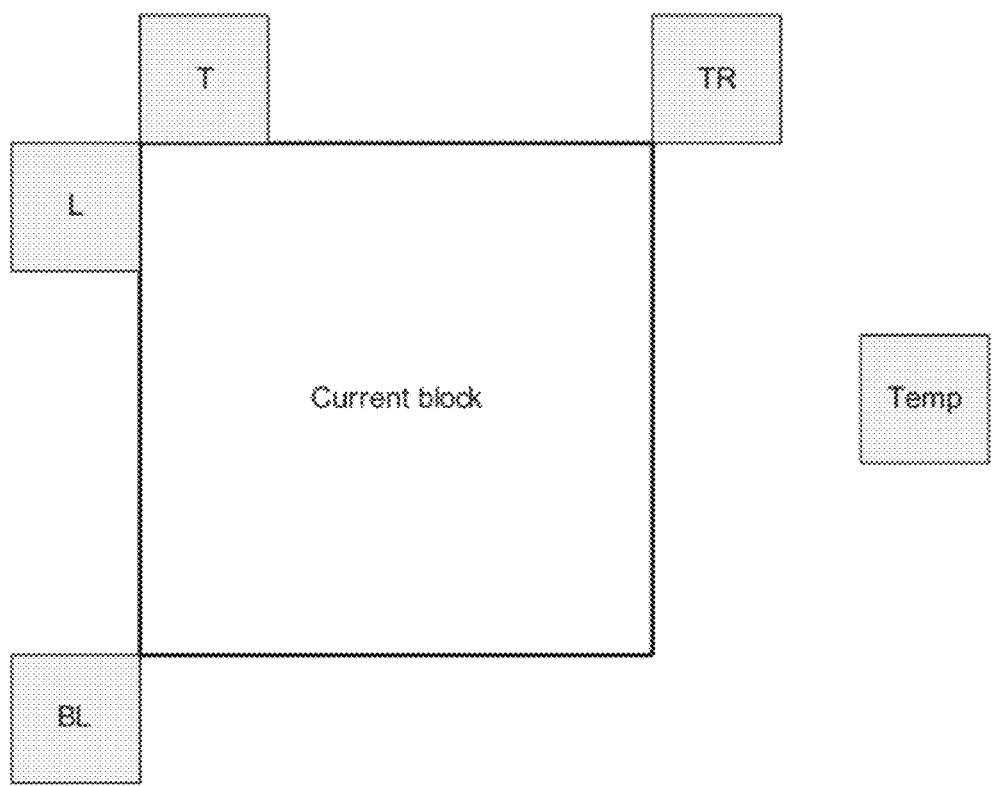
FIG. 7 is a conceptual diagram illustrating the location of different neighboring video blocks relative to current video block such that the current video block may use information of one or more different neighboring video blocks in a bi-predictive merge mode, consistent with this disclosure.

FIG. 7 is a conceptual illustration showing one example of five different neighbors that may be considered for purposes of bi-predictive merge mode. In this example, the top (T) neighbor, top right (TR) neighbor, left (L) neighbor, bottom left (BL) neighbor, and co-located temporal (Temp) neighbor from another video frame may be considered for purposes of bi-predictive merge mode. Of course, other neighbors (spatial or temporal) could also be used for any merge mode inheritance of motion information.

Again, with merge mode, the current video block may inherit all motion information of a neighboring candidate block. That means the current block will have the same motion vector, same reference frame, and same prediction mode (uni-prediction or bi-prediction) as the selected neighboring block. The selected neighboring block may be signaled as part of an encoded bitstream, but the motion information does not need to be signaled because the decoder can obtain the motion information from the selected neighboring block.

Consistent with this disclosure, a bi-predictive merge mode is supported, which inherits motion information from two different neighboring blocks, wherein the two different neighboring blocks were each encoded in a uni-predictive mode. The described bi-predictive merge mode may increase the number of bi-predictive candidates that can be used in the context of merge mode. Rather than signaling one neighbor, the bi-predictive merge mode may signal two different neighbors. The bi-predictive merge mode may be an extension to a conventional merge mode by simply increasing candidate neighboring blocks to include combinations thereof, or may be an entirely separate mode relative to a conventional merge mode.

Assuming the spatial and temporal candidate neighboring blocks shown in FIG. 1, the described bi-predictive merge mode may work in at least two scenarios. In a first scenario, all neighboring candidate neighboring blocks are coded in uni-predictive modes. In this case, any two of the candidate blocks can be selected, and the motion information from both selected candidates can be combined to achieve a bi-prediction. For example, assume that the neighboring blocks shown in FIG. 1 are coded according to the following information:

L: uni-pred, L0, refIdx=0
T: uni-pred, L1, refIdx=0
TR: uni-pred, L0, refIdx=1
BL: uni-pred, L0, refIdx=0
Temp: uni-pred, L1, refIdx=1

In this case, there are 10 combinations of any two of five candidates. L0 refers to a first list of predictive data, and L1 refers to a second list of predictive data. The refIdx may comprise an index to a particular picture in the respective list. The video encoder can select the best combination (e.g., in terms of encoding rate and distortion), and can send syntax information that identifies the two selected neighboring blocks. The decoder can decode the syntax information and obtain the motion information from the selected neighboring blocks.

In a second scenario, at least one of the candidate neighboring blocks may be coded in a bi-predictive mode. In this case, any two of the uni-predictive neighboring blocks can be considered (in combination) to obtain a bi-predictive merge mode candidate. However, any bi-predictive blocks can also be used alone for consideration as a bi-predictive merge candidate. For example, assume that the neighboring blocks shown in FIG. 1 are coded according to the following information:

L: bi-pred, L0, refIdx=0, L1, refIdx=0
T: uni-pred, L1, refIdx=0
TR: uni-pred, L0, refIdx=1
BL: uni-pred, L0, refIdx=0
Temp: bi-pred, L0, refIdx=0, L1, refIdx=1

Again, L0 may comprise a value that refers to a first list of predictive data, L1 may comprise a value that refers to a second list of predictive data, and refIdx may be values that define indexes to a particular picture in the respective list. In this second, example, two of the five candidates are already bi-predictive mode, so these can be considered alone for purposes of bi-predictive merge modes. In addition, different combinations of the three remaining uni-predictive candidates can be considered. So, in this case, there will be 5 bi-predictive mode possibilities:

1. L
2. Temp
3. T+TR
4. T+BL
5. TR+BL

In this second example, the encoder can select the best neighbor (or combination of neighbors) from these five possibilities (e.g., in terms of encoding rate and distortion), and can send syntax information that identifies which individual neighbor or combination of neighbors was used in the merge mode. The decoder can decode the syntax information and obtain the motion information from the selected neighboring block(s).

In the example of FIG. 7, five candidates are shown. However, additional candidates may also be considered either in the same areas as the candidates of FIG. 7 or in other areas. In some cases, there may be several top (T) candidates, several top left (TL) candidates, several left (L) candidates, several bottom left (BL) candidates, and several temporal (T) candidates. In some cases, the size of the current block may differ from that of the candidates, in which case, the top edge or left edge of the current block may be adjacent several candidates. In other cases, candidates at even further distances from the current video block may be considered for purposes of the bi-predictive merge mode described in this disclosure. Many different scenarios using many different candidates are possible consistent with this disclosure. Thus, FIG. 7 is merely one example illustrating five neighboring candidates relative to the current video block.

Figure 8:
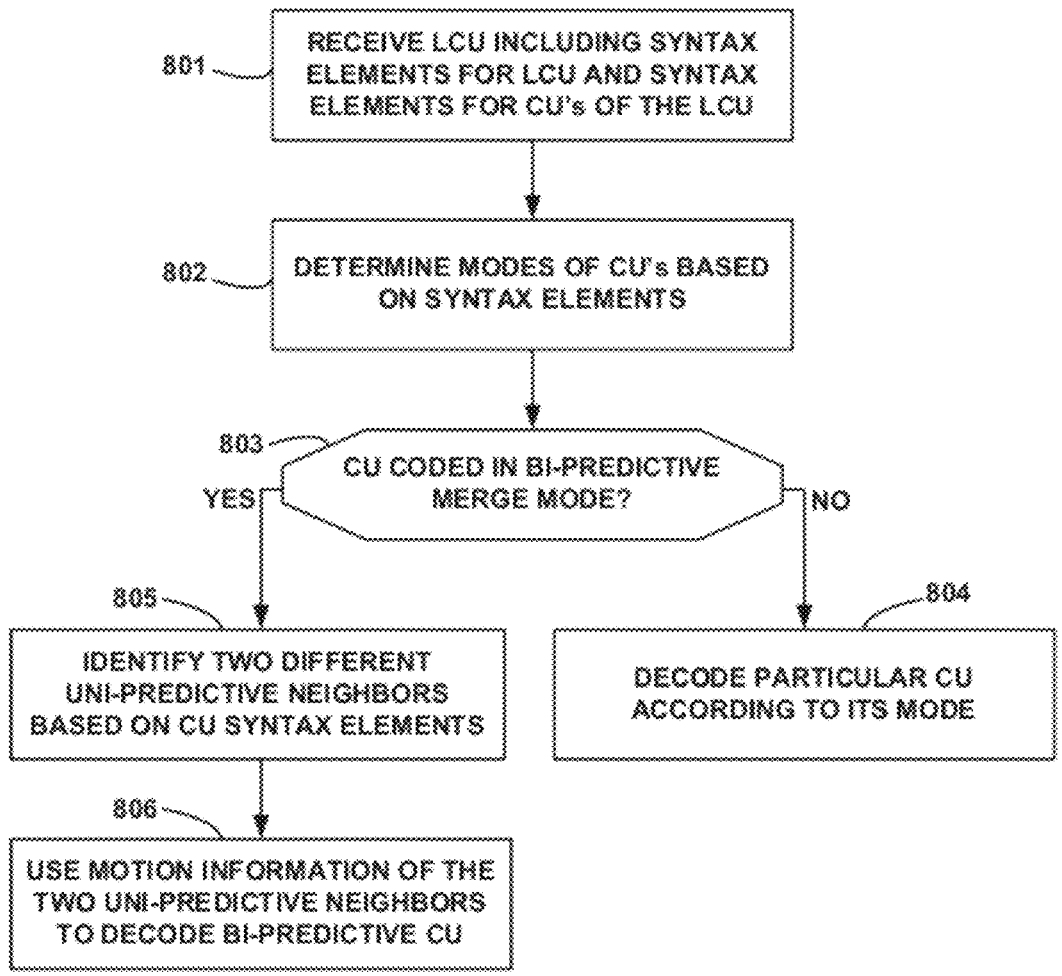
FIGS. 8 and 9 are flow diagrams illustrating techniques consistent with this disclosure.

FIG. 8 is a flow diagram illustrating a decoding technique consistent with this disclosure. FIG. 8 will be described from the perspective of video decoder 60 of FIG. 6, although other devices may perform similar techniques. As shown in FIG. 8, video decoder 60 receives an LCU including syntax elements for the LCU and for the CU's within the LCU (801). In particular, entropy decoding unit 52 may receive a bitstream that includes the LCU and parse the bitstream to identify the syntax elements, which can be forwarded to prediction decoding unit 54. Accordingly, prediction decoding unit 54 can modes of the CU's based on the syntax elements. In other examples, modes may be defined at the PU level rather than at the CU level.

In determining the modes, prediction decoding unit 54 identifies any CU's coded in bi-predictive merge mode (803). If any CU is not coded in bi-predictive merge mode ("no" 803), then that CU is decoded according to its mode (804). For example, many different intra modes and many different inter modes may be supported. If any CU is coded in the bi-predictive merge mode ("yes" 803), then this CU is bi-predictive. However, its motion vectors for bi-prediction come from two uni-directional neighbors as discussed herein. In this case, MC unit 86 of prediction decoding unit 54 identifies two different uni-predictive neighbors to the CU based on the CU syntax element (805), and uses motion information of the uni-predictive neighbors to decode the bi-predictive CU.

Figure 9:
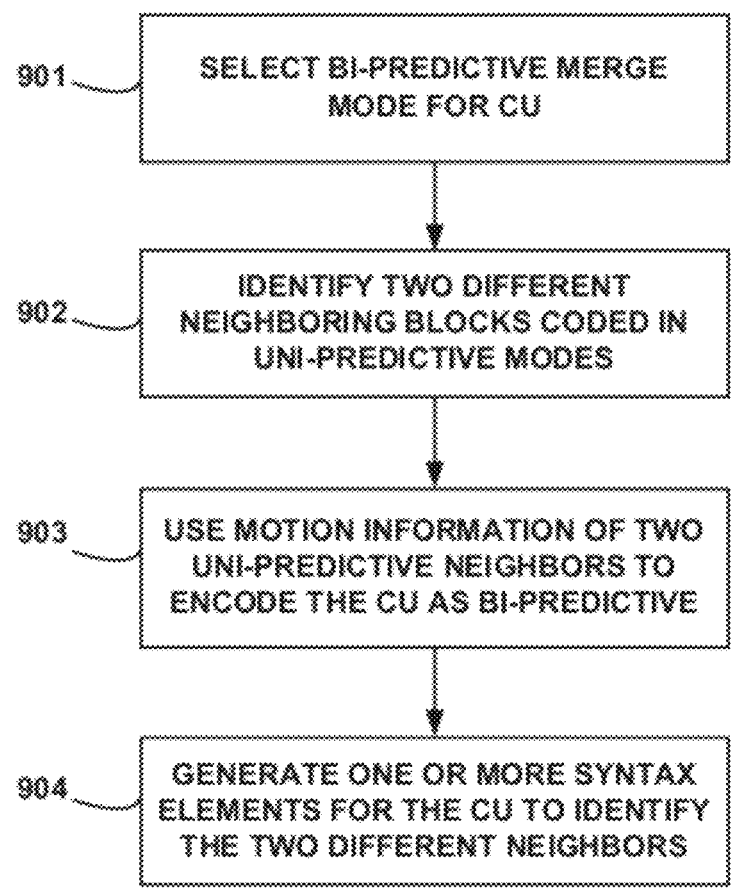

FIG. 9 is a flow diagram illustrating an encoding technique consistent with this disclosure. FIG. 9 will be described from the perspective of video encoder 50 of FIG.

4, although other devices may perform similar techniques. As shown in FIG. 9, prediction encoding unit 32 selects a bi-predictive merge mode for a CU. For example, prediction encoding unit 32 (see FIG. 5) may include a mode selection unit 75 that selects the bi-predictive merge mode 35X for a CU based on a plurality of possible modes 35. R-D unit 75 may identify the coding rate and level of quality or distortion associated with different modes by analyzing the results of coding by ME unit 76 and MC unit 77 for various inter modes and by analyzing the results of coding by intra prediction unit 78 for intra modes. In this way, mode selection unit 75 may identify the best mode for any given situation.

Once prediction encoding unit 32 selects the bi-predictive merge mode 35X for a CU, prediction unit identifies two different neighboring blocks coded in uni-predictive modes (902). This process of identifying the two different neighboring blocks coded in uni-predictive modes may be performed by ME unit 76 in the manner similar to that described above. For example, ME unit 76 and MC unit 77 may generate coding results of different combinations of motion information from different uni-directional neighbors, and these results may be analyzed by R-D unit 75 to determine the coding rate and quality or distortion associated with such different combinations. Ultimately, R-D unit 75 can determine which bi-predictive merge mode combination of uni-predictive neighbors yields the best coding results.

Accordingly, prediction encoding unit 32 uses the motion information of the best combination of two uni-predictive neighbors to encoding the CU as bi-predictive (903). Of course, any bi-predictive neighbors may also be considered, and possibly used for merge mode coding if the rate-distortion results are better than using two uni-predictive neighbors. Prediction unit 32 (e.g., ME unit 76 or MC unit 77) generates one or more syntax elements for the CU to identify the two different uni-predictive neighbors used for the bi-predictive merge mode coding of the CU. The syntax elements, for example, may comprise index values that identify two of the neighbors of the CU, such as the left (L) neighbor, bottom left (BL) neighbor, (T) top neighbor, top right (TR) neighbor, or co-located temporal (T) neighbor as conceptually illustrated in FIG. 7. However, many other signaling schemes for the syntax elements may also be used.

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials.

The computer-readable medium may comprise a tangible computer readable storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of using bi-predictive merge mode temporal prediction candidates for improving coding efficiency in decoding video data, the method comprising:
    receiving one or more syntax elements for a current video block, wherein the one or more syntax elements define one or more merge mode candidates from a set of candidates to be used to code the current video block according to a bi-predictive merge mode that includes a bi-predictive merge mode candidate for improving the coding efficiency;
    generating the set of candidates that includes the bi-predictive merge mode candidate for improving the coding efficiency, wherein a first candidate in the set of candidates is a left candidate that inherits motion information from a left neighboring block of a group of spatially neighboring video blocks of the current video block that includes multiple different spatially neighboring video blocks of the current video block that are positioned in a same frame of the encoded video data, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits motion information from two different spatially neighboring video blocks of the group of spatially neighboring blocks for improving the coding efficiency, both of the two different spatially neighboring blocks being coded in uni-predictive mode;
    determining that the one or more syntax elements indicate an index that defines the third candidate as being selected from the set of candidates for decoding the current video block; and
    decoding the current video block based on the bi-predictive merge mode candidate that inherits the motion information from the two different spatially neighboring video blocks that are both coded in the uni-predictive modes.

2. The method of claim 1, wherein decoding the current video block based on the bi-predictive merge mode candidate includes using the motion information inherited from the two different spatially neighboring video blocks of the current video block that are both coded in the uni-predictive modes, and wherein the inherited motion information comprises two different uni-predictive motion vectors associated with the two different spatially neighboring video blocks of the current video block.

3. The method of claim 2, wherein the inherited motion information further comprises at least two values associated with the two different uni-predictive motion vectors, and wherein the at least two values identify one or more lists of predictive data associated with the two different uni-predictive motion vectors.

4. The method of claim 1, wherein the current video block comprises a coding unit (CU) defined according to a high efficiency video coding (HEVC) standard, wherein the CU is defined relative to a largest coding unit (LCU) according to a quadtree partitioning scheme, the method further comprising:

receiving LCU syntax data that defines the quadtree partitioning scheme; and receiving mode information for the CU that defines the bi-predictive merge mode candidate, wherein the one or more syntax elements are included in the mode information for the CU.

5. The method of claim 1, wherein the current video block comprises a prediction unit (PU) of a coding unit (CU) that is defined according to a high efficiency video coding (HEVC) standard.

6. A method of temporal prediction for improving coding efficiency in encoding video data, the method comprising:

generating a bi-predictive merge mode candidate for encoding a current video block according to a bi-predictive merge mode, such that the bi-predictive merge mode candidate inherits motion information from two different spatially neighboring video blocks of the current video block, the two different spatially neighboring video blocks both being coded in uni-predictive modes, wherein the current video block and a group of spatially neighboring video blocks of the current video block that includes the two different spatially neighboring video blocks of the current video block are positioned in a same frame of the encoded video data;

selecting a candidate from a set of candidates for encoding the current video block according to the bi-predictive merge mode wherein a first candidate in the set of candidates is a left candidate that inherits motion information from a left neighboring block of the group of the spatially neighboring video blocks, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits the motion information from the two different spatially neighboring video blocks that are coded in the uni-predictive modes, wherein the selection is based on rate-distortion analysis indicative of coding efficiency of the third candidate; and upon selecting the third candidate from the set of candidates:

encoding the current video block based on the bi-predictive merge mode candidate that inherits the motion information from the two different spatially neighboring video blocks of the current block that are coded in the uni-predictive modes; and generating one or more syntax elements that identify the bi-predictive merge mode candidate to a video decoder.

7. The method of claim 6, wherein encoding the current video block based on the bi-predictive merge mode candidate includes using the motion information inherited from the two different spatially neighboring video blocks of the current video block that are coded in the uni-predictive modes and wherein the inherited motion information comprises two different uni-predictive motion vectors associated with the two different spatially neighboring video blocks of the current video block.

8. The method of claim 7, wherein the inherited motion information further comprises at least two values associated with the two different uni-predictive motion vectors, wherein the at least two values identify one or more lists of predictive data associated with the two different uni-predictive motion vectors.

9. The method of claim 6, wherein the current video block comprises a coding unit (CU) defined according to a high efficiency video coding (HEVC) standard, the method further comprising:

defining the CU relative to a largest coding unit (LCU) according to a quadtree partitioning scheme;

generating an LCU syntax data that defines the quadtree partitioning scheme; and generating mode information for the CU that defines the bi-predictive merge mode candidate, wherein the one or more syntax elements are included in the mode information for the CU.

10. The method of claim 6, wherein the current video block comprises a prediction unit (PU) of a coding unit (CU) that is defined according to a high efficiency video coding (HEVC) standard.

11. A video decoding device that uses bi-predictive merge mode temporal prediction candidates for improving coding efficiency to decode video data, the video decoding device comprising:

a memory configured to store at least a portion of the video data; and a video decoder configured to:

receive one or more syntax elements for a current video block of the stored portion of the video data, wherein the one or more syntax elements define one or more merge mode candidates from a set of candidates to be used to code the current video block according to a bi-predictive merge mode that includes a bi-predictive merge mode candidate for improving the coding efficiency;

generate the set of candidates that includes the bi-predictive merge mode candidate for improving the coding efficiency, wherein a first candidate in the set of candidates is a left candidate that inherits motion information from a left neighboring block of a group of spatially neighboring video blocks of the current video block that includes multiple different spatially neighboring video blocks of the current video block that are positioned in a same frame of the encoded video data, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits motion information from two different spatially neighboring video blocks of the group of spatially neighboring blocks for improving the coding efficiency, both of the two different spatially neighboring blocks being coded in uni-predictive modes; determine that the one or more syntax elements indicate an index that defines the third candidate as being selected from the set of candidates for decoding the current video block; and decode the current video block based on the bi-predictive merge mode candidate that inherits the motion information from the two different spatially neighboring video blocks that are coded in uni-predictive modes.

12. The video decoding device of claim 11, wherein the video decoder includes:
an entropy decoding unit configured to receive and decode the one or more syntax elements; and
a prediction unit configured to use the motion information inherited from the two different spatially neighboring video blocks of the current video block to decode the current video block based on the bi-predictive merge mode candidate.

13. The video decoding device of claim 12, wherein the inherited motion information comprises two different uni-predictive motion vectors associated with the two different spatially neighboring video blocks.

14. The video decoding device of claim 13, wherein the inherited motion information further comprises at least two values associated with the two different uni-predictive motion vectors, wherein the values identify one or more lists of predictive data associated with the two different uni-predictive motion vectors.

15. The video decoding device of claim 11, wherein the current video block comprises a coding unit (CU) defined according to a high efficiency video coding (HEVC) standard, wherein the CU is defined relative to a largest coding unit (LCU) according to a quadtree partitioning scheme, wherein the decoder:
receives LCU syntax data that defines the quadtree partitioning scheme; and
receives mode information for the CU that defines the bi-predictive merge mode candidate, wherein the one or more syntax elements are included in the mode information for the CU.

16. The video decoding device of claim 11, wherein the current video block comprises a prediction unit (PU) of a coding unit (CU) that is defined according to a high efficiency video coding (HEVC) standard.

17. The video decoding device of claim 11, wherein the video decoding device comprises one or more of:
an integrated circuit;
a microprocessor; or
a wireless communication device.

18. A video encoding device that uses temporal prediction for improving coding efficiency, the video encoding device comprising:
a memory configured to store video data; and
a video encoder configured to:
generate a bi-predictive merge mode candidate for encoding a current video block of the stored video data according to a bi-predictive merge mode, such that the bi-predictive merge mode candidate inherits motion information from two different spatially neighboring video blocks of the current video block, the two different spatially neighboring video blocks both being coded in uni-predictive modes, wherein the current video block and a group of spatially neighboring video blocks of the current video block that includes the two different spatially neighboring video blocks of the current video block are positioned in a same frame of the encoded video data;

select a candidate from a set of candidates for encoding the current video block according to the bi-predictive merge mode, wherein a first candidate in the set of candidates is a left candidate that inherits motion information from a left neighboring block of the group of the spatially neighboring video blocks, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits the motion information from the two different spatially neighboring video blocks that are coded in the uni-predictive modes, wherein the selection is based on rate-distortion analysis indicative of coding efficiency of the third candidate; and upon a selection of the third candidate from the set of candidates:

encode the current video block based on the bi-predictive merge mode candidate that inherits the motion information from the two different spatially neighboring video blocks that are coded in the uni-predictive modes; and generate one or more syntax elements that identify the bi-predictive merge mode candidate to a video decoder.

19. The video encoding device of claim 18, wherein to encode the current video block of the stored video data based on the bi-predictive merge mode candidate, the video encoder is configured to use the motion information inherited from the two different spatially neighboring video blocks of the current video block that are both coded in the uni-predictive modes, and wherein the inherited motion information comprises two different uni-predictive motion vectors associated with the two different spatially neighboring video blocks of the current video block of the stored video data.

20. The video encoding device of claim 19, wherein the inherited motion information further comprises at least two values associated with the two different uni-predictive motion vectors, wherein the at least two values identify one or more lists of predictive data associated with the two different uni-predictive motion vectors.

21. The video encoding device of claim 18, wherein the current video block comprises a coding unit (CU) defined according to a high efficiency video coding (HEVC) standard, wherein the video encoder includes:
a quadtree partition unit configured to define the CU relative to a largest coding unit (LCU) according to a quadtree partitioning scheme, and generate an LCU syntax data that defines the quadtree partitioning scheme; and
a prediction unit configured to generate mode information for the CU that defines the bi-predictive merge mode candidate, wherein the one or more syntax elements are included in the mode information for the CU.

22. The video encoding device of claim 18, wherein the current video block comprises a prediction unit (PU) of a coding unit (CU) that is defined according to a high efficiency video coding (HEVC) standard.

23. The video encoding device of claim 18, wherein the video encoding device comprises one or more of:
an integrated circuit;
a microprocessor; or
a wireless communication device.

24. A device for using bi-predictive merge mode temporal prediction candidates for improving coding efficiency in decoding video data, the device comprising:
means for receiving one or more syntax elements for a current video block, wherein the one or more syntax elements define one or more merge mode candidates from a set of candidates to be used to code the current video block according to a bi-predictive merge mode that includes a bi-predictive merge mode candidate for improving the coding efficiency;
means for generating the set of candidates that includes the bi-predictive merge mode candidate for improving the coding efficiency, wherein a first candidate in the set of candidates is a left candidate that inherits motion information from a left neighboring block of a group of spatially neighboring video blocks of the current video block that includes multiple different spatially neighboring video blocks of the current video block that are positioned in a same frame of the encoded video data, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits motion information from two different spatially neighboring video blocks of the group of spatially neighboring blocks for improving the coding efficiency, both of the two different spatially neighboring blocks being coded in uni-predictive modes;
means for determining that the one or more syntax elements indicate an index that defines the third candidate as being selected for decoding the current video block; and
means for decoding the current video block based on the bi-predictive merge mode candidate that inherits the motion information from the two different spatially neighboring video blocks that are both coded in the uni-predictive modes when the one or more syntax elements define the third candidate.

25. A device that uses temporal prediction for improving coding efficiency for encoding video data, the device comprising:
means for generating a bi-predictive merge mode candidate for encoding a current video block according to a bi-predictive merge mode, such that the bi-predictive merge mode candidate inherits motion information from two different spatially neighboring video blocks of the current video block, the two different spatially neighboring video blocks both being coded in uni-predictive modes, wherein the current video block and a group of spatially neighboring video blocks of the current video block that includes the two different spatially neighboring video blocks of the current video block are positioned in a same frame of the encoded video data;
means for selecting a candidate from a set of candidates for encoding the current video block according to the bi-predictive merge mode, wherein a first candidate in the set of candidates is a left candidate that inherits motion information from a left neighboring block of the group of the spatially neighboring video blocks, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits the motion information from the two different spatially neighboring video blocks that are coded in uni-predictive modes, wherein the selection is based on rate-distortion analysis indicative of coding efficiency of the third candidate;
means for encoding, upon selecting the third candidate from the set of candidates, the current video block based on the bi-predictive merge mode candidate that inherits the motion information from the two different spatially neighboring video blocks that are coded in the uni-predictive modes; and
means for generating, upon selecting the third candidate from the set of candidates, one or more syntax elements that identify the bi-predictive merge mode candidate to a video decoder.

26. A non-transitory computer-readable storage medium comprising instructions that upon execution cause a processor to use bi-predictive merge mode temporal prediction candidates for improving coding efficiency in decoding encoded video data, wherein the instructions cause the processor to:
upon receiving one or more syntax elements for a current video block, wherein the one or more syntax elements define one or more merge mode candidates from a set of candidates to be used to code the current video block according to a bi-predictive merge mode that includes a bi-predictive merge mode candidate for improving the coding efficiency;
generate the set of candidates that includes the bi-predictive merge mode candidate for improving the coding efficiency, wherein a first candidate in the set of candidates is a left candidate that inherits motion information from a left neighboring block of a group of spatially neighboring video blocks of the current video block that includes multiple different spatially neighboring video blocks of the current video block that are positioned in a same frame of the encoded video data, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits motion information from two different spatially neighboring video blocks of the group of spatially neighboring blocks for improving the coding efficiency, both of the two different spatially neighboring blocks being coded in uni-predictive modes;
determine that the one or more syntax elements indicate an index that defines the third candidate as being selected for decoding the current video block; and
decode the current video block based on the bi-predictive merge mode candidate that inherits the motion information from the two different spatially neighboring video blocks that are both coded in the uni-predictive modes.

27. A non-transitory computer-readable storage medium comprising instructions that upon execution cause a processor to encode video data using temporal prediction for improving coding efficiency, wherein the instructions cause the processor to:

generate a bi-predictive merge mode candidate for encoding a current video block according to a bi-predictive merge mode, such that the bi-predictive merge mode candidate inherits motion information from two different spatially neighboring video blocks of the current video block, the two different spatially neighboring video blocks both being coded in uni-predictive modes, wherein the current video block and a group of spatially neighboring video blocks of the current video block that includes the two different spatially neighboring video blocks of the current video block are positioned in a same frame of the encoded video data;

select a candidate from a set of candidates for encoding the current video block according to the bi-predictive merge mode, wherein a first candidate in the set of candidates is a left candidate that inherits motion information from a left neighboring block of the group of the spatially neighboring video blocks, a second candidate in the set of candidates is a temporal candidate that inherits motion information from a temporal neighbor block of the current video block that is positioned in a different frame with respect to the current video block, and a third candidate in the set of candidates is the bi-predictive merge mode candidate that inherits the motion information from the two different spatially neighboring video blocks that are coded in the uni-predictive modes, wherein the selection is based on rate-distortion analysis indicative of coding efficiency of the third candidate; and upon selecting the third candidate from the set of candidates:

encode the current video block based on the bi-predictive merge mode candidate that inherits the motion information from the two different spatially neighboring video blocks of the current block that are coded in the uni-predictive modes; and generate one or more syntax elements that identify the bi-predictive merge mode candidate to a video decoder.

* * * * *